July 8, 1947.    R. A. BEHLEN    2,423,547
CALENDERED FILTER MATERIAL AND METHOD OF FORMING SAME
Filed Jan. 1, 1944

INVENTOR
ROBERT A. BEHLEN
BY Hyde and Meyer.
ATTORNEYS.

Patented July 8, 1947

2,423,547

UNITED STATES PATENT OFFICE 2,423,547

CALENDERED FILTER MATERIAL AND METHOD OF FORMING SAME

Robert A. Behlen, Chagrin Falls, Ohio, assignor to Air-Maze Corporation, Cleveland, Ohio, a corporation of Delaware Application January 1, 1944, Serial No. 516,616

1 Claim. (Cl. 210—169)

This invention relates to improvements in filter material for use where small particles are separated by means of a sheet of foraminate material, and to a method of forming the same.

Among the objects of the present invention are the provision of a sheet of material comparatively cheap to produce and having a very large number of fine openings, while at the same time the material has in general a very smooth surface which is readily cleaned.

Another object of the invention is to provide a foraminous sheet which is readily gripped between flat holding surfaces.

Other objects and advantages of my invention will be apparent from the accompanying specification and drawings and the essential features will be summarized in the claims.

In the drawings,

Fig. 6 is a plan view of one type of filter apparatus utilizing my invention; while

For purposes of illustration only and by no means as a limitation on the use of my invention, I have shown the same as applied to an oil filter of the type disclosed in the copending application of George M. Walton, Serial No. 483,911, filed April 21, 1943.

In filters of this type small particles are to be separated from a fluid stream and often a high rate of fluid flow or high pressures are involved, or both. It is desirable therefore to provide a sheet of filtering material supplied with a very large number of openings of very small size, yet with the requisite strength to withstand the fatigue often induced by rapid vibrations due to pumping, engine vibration and the like. The material filtered out settles on the surface of the foraminous filtering sheet from which it must be periodically cleaned either by hand or automatically. For this purpose a filtering surface as smooth as possible is desirable. My improved screen material meets all of these requirements.

If a woven mesh screen is utilized with a plain weave involving one set of wires or filaments passing alternately over and under another set of wires or filaments, it is necessary to use very fine wires if a sufficiently large number of openings per square inch is provided. Such a screen material is inherently weak because of the very fine wires of which it is woven.

Figure 1:
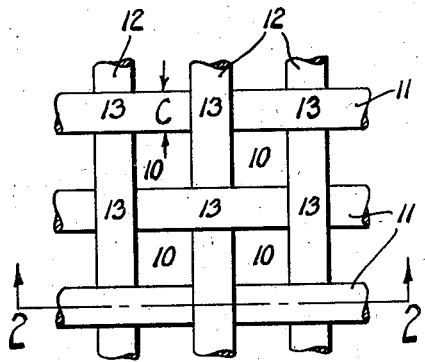
Fig. 1 is a greatly enlarged plan view of the woven screen material which provides the basis for my improved sheet.
Figure 2:
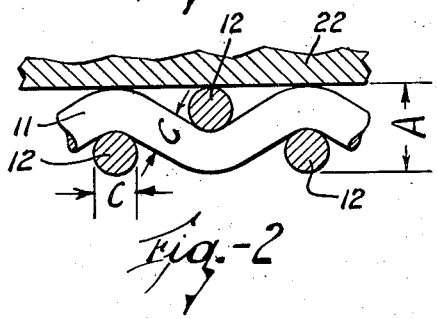
Fig. 2 is a sectional view taken along the line 2—2 of Fig. 1.

In Fig. 1 I have illustrated on a very greatly magnified scale a portion of a sheet of wire screen woven 100 meshes to the inch from a wire having approximately .0045 inch diameter. While this is a relatively fine wire, yet it is much coarser than the wires referred to in the preceding paragraph from which are usually woven screen meshes of 180 or 200 openings per inch. Obviously if the wires of Fig. 1 are of .0045 inch diameter and spaced on center lines .010 inch apart, the openings indicated at 10 measure .0055 inch each direction and particles of that size will pass through the openings. For many filtering purposes the openings must be smaller than this so as to hold smaller particles. The thickness of the sheet illustrated in Fig. 1 denoted by the dimension A, Fig. 2, is approximately .009 or slightly greater. I have discovered that by a proper flattening operation of this sheet the metal of the wires 11 and 12 may be flattened and caused to flow slightly toward the openings 10 so as to produce filter material satisfactory for my purpose.

Figure 3:
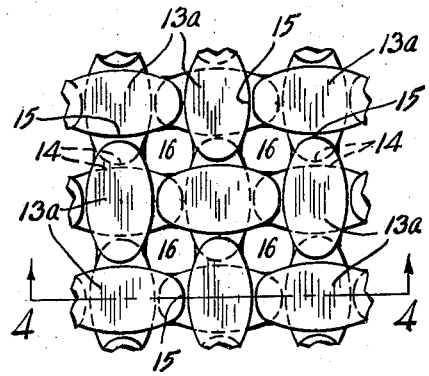
Fig. 3 is a plan view, greatly enlarged, of the material of Fig. 1 after it has been flattened according to the teachings of my invention.
Figure 4:
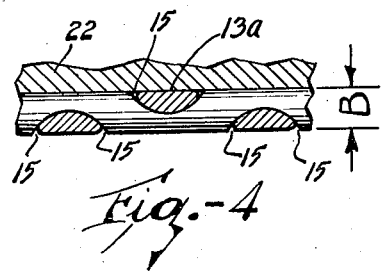
Fig. 4 is a sectional view taken along the line 4—4 of Fig. 3.

In Figs. 3 and 4 I show the material of Figs. 1 and 2 flattened by pressing or rolling to the point where the upper and lower surfaces of the sheet lie in substantially parallel planes separated by a distance not more than slightly greater than the diameter C of one of the wires from which the screen was originally woven. In other words, the dimension B shown in Fig. 4 is approximately equal to or less than the dimension C indicated in Figs. 1 and 2. When the material is rolled, for instance, between flat rolls, the high spots or nodes of the crossing wires indicated at 13 (Fig. 1) are flattened as indicated at 13a, Fig. 3. The same effect is created on the other side of the screen and the position of these flattened wires is indicated in broken lines at 14, Fig. 3. If this flattening process is carried far enough the result is like that shown in Fig. 3 when the sheet is examined under a microscope. My invention comprises flattening the nodes as at 13a until adjacent flattened surfaces substantially touch each other as in Fig. 3. In actual practice the eye or the hand is unable to detect the slight unevenness indicated at 15, Figs. 3 and 4, but instead the entire sheet appears to be perfectly smooth. To further emphasize this point it should be realized that in the material under discussion there are 10,000 of the openings 10 of Fig. 1, or of the openings 16 of Fig. 3, per square inch of material. It will be noted in Fig. 3 that the material of the two sets of wires has been so forced toward the openings through the material that the openings 16 are reduced from the size of the openings 10. This reduction is controlled by the thickness B to which the material is flattened and of course by the elastic limits of the metal or other material of which the screen is composed.

Figure 7:
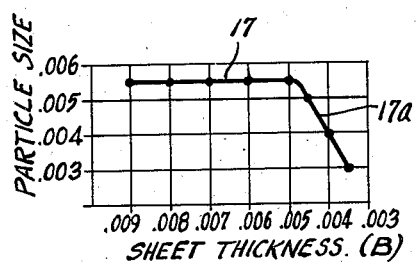
Fig. 7 is a graph showing the relationship between the thickness of the screen cloth material and the particle size which will pass through it.

To illustrate how critical this dimension B is, I have shown in Fig. 7 a graph representing the actual results obtained with material measuring 100 meshes per inch each direction and woven of bronze wire having the original dimension C of .0045 inches. The flat portion 17 of the graph indicates that the sheet may be flattened from an original thickness of .009 inch to about .005 inch without changing the particle size which will pass through the openings 10, namely, .0055 inch for the particle. At a sheet thickness B of approximately the wire diameter .0045 inch (or just slightly thicker), the metal of the wires begins to encroach upon the spaces 10 or 16 so that when the thickness B is .0045 inch, the size of the particle which will pass through the opening 16 is .005 inch. At a sheet thickness of .004 inch the particle size which will pass through the opening 16 has dropped to .004 inch. At a sheet thickness of .0035 inch the particle size which will pass through the opening 16 is .003 inch. This is clearly shown on the portion 17a of the graph. Thus by regulating the thickness B of the finished sheet one can select the particle size which will be held upon the sheet of filtering material.

It should be obvious from Figs. 3 and 4 that the very smooth surface formed on the upper and lower faces of the sheet of filtering material will greatly aid in scraping or cleaning particles from the face of the sheet when cleaning operations are required. There is, however, an additional advantage to this flat surface which I desire to point out.

Figure 5:
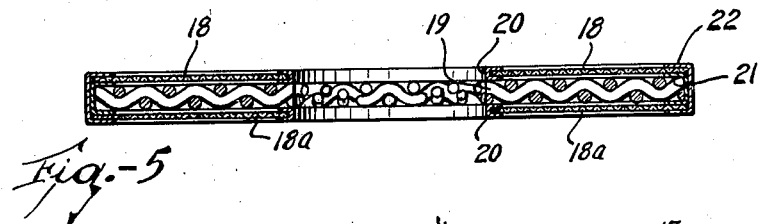
Fig. 5 is an enlarged transverse sectional view taken along the line 5—5 of Fig. 6 and illustrating one use of my improved filter material.
Figure 6:
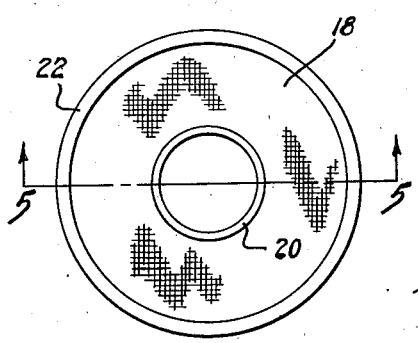

In Figs. 5 and 6 I have shown a filter disk of the type utilized in the copending application of George M. Walton mentioned above. This comprises sheets 18 and 18a of the flattened filter material shown in Figs. 3 and 4. These are separated by an annular member 19 which may be of various forms but which is here shown as comprising a sheet of much coarser woven screen. These composite disks are designed for assembly upon a hollow tube with solid ring separators between adjacent disks as shown in the copending application. This construction leaves the annular area of the sheets 18 and 18a open to the dirty fluid to be filtered, which fluid flows inwardly along the coarse screen 19 toward the center and then away through the hollow tube. One of the difficulties encountered in building these composite disks is the holding of the sheets 18 and 18a at their edges and more particularly, at their outer periphery. My improved material is peculiarly adapted to provide a very strong construction of this sort. As shown in Figs. 5 and 6, at their inner diameters the sheets 18 and 18a are bound with ferrules 20 generally U-shape in cross section. At its outer periphery the screen 19 is provided with a flat binding 21 in the form of a U-shape ferrule. The outer edges of sheets 18 and 18a lie on the flat horizontal surfaces of this ferrule 21, as shown in Fig. 5, and are bound thereto by means of an outer ring 22 which is bent down upon the outer peripheries of the sheets 18 and 18a, binding them tightly against the ferrule 21. The nature of the contact provided at this point is illustrated by drawing in a portion of the member 22 in Figs. 2 and 4. It is obvious that in the case of Fig. 4 there is a much greater area of contact between the sheet of filter material than is provided in the case of the original woven screen under like circumstances as illustrated in Fig. 2. I am thus able to build a more dependable filter using my improved flattened screen material.

Referring again to Fig. 7 it should be noted that the partial closure of the openings 16 through the screen does not occur until the flattening process has proceeded practically to the point where the thickness B of the finished sheet is approximately equal to the diameter C of the original wire.

If the sheet of Fig. 3 is flattened a little more, the elliptic areas there shown actually meet to provide a very smooth surface over the entire face on each side of the sheet.

I have thus found a method of forming filter material to produce controlled size openings by regulating the amount of flattening applied to a fabric of woven metal wires. I regulate the size of openings through the fabric by stopping the flattening operation at a fabric thickness equal to or less than the diameter of the original wires of which the fabric was woven. The greater the reduction of fabric thickness below the point of original wire diameter, the smaller the filter openings become.

What I claim is:

Filter material comprising a cloth of deformable material having two series of metal filaments in parallel relationship, the filaments of one series crossing the filaments of the other series at right angles, each filament passing alternately over and under crossing filaments providing nodes at said crossing points, each filament being separated from other parallel filaments by definite substantially fixed distances providing fixed filter openings of the order of a few thousandths of an inch, said cloth being flattened to a substantially uniform thickness over its entire surface, and said flattening being suficient to cause the metal of each filament at each node to flatten out in a plane until it substantially touches adjacent flattened nodes in the same plane, whereby said filter material provides a flat surface easily cleaned and said filament material is forced into said fixed filter openings to limit said openings by a predetermined amount.

ROBERT A. BEHLEN.

REFERENCES CITED

The following references are of record in the file of this patent:

UNITED STATES PATENTS

| Number | Name | Date |
|---|---|---|
| 1,147,279 | Sweetland | June 20, 1915 |
| 2,082,513 | Roberts | June 1, 1937 |
| 485,488 | Cockrell | Nov. 1, 1892 |
| 1,747,631 | Helman | Feb. 18, 1930 |
| 2,164,142 | Moore | June 27, 1939 |